United States Patent
Rodriguez et al.

(10) Patent No.: US 11,023,359 B2
(45) Date of Patent: *Jun. 1, 2021

(54) AUTOMATED API GENERATION

(71) Applicant: Kleeen Software, San Jose, CA (US)

(72) Inventors: Mainor Gamboa Rodriguez, San Jose, CA (US); Edison Romero, San Jose, CA (US); Sebastian Alvarez, San Jose, CA (US); Manfred Artavia Gomez, San Jose, CA (US); Aaron Gomez, San Jose, CA (US); Joshua Hailpern, San Jose, CA (US); Gabriel Jimenez, San Jose, CA (US); Mario Octavio Jimenez Rivas, San Jose, CA (US); Treisy Jimenez Vega, San Jose, CA (US); Jorge Ramirez Zamora, San Jose, CA (US); Hector Solano, San Jose, CA (US); Juan Carlos Valerio Arrieta, San Jose, CA (US); Amy Yoshitsu, San Jose, CA (US)

(73) Assignee: Kleeen Software, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,553

(22) Filed: Sep. 12, 2019

(65) Prior Publication Data
US 2021/0026757 A1    Jan. 28, 2021

Related U.S. Application Data

(60) Provisional application No. 62/794,446, filed on Jan. 18, 2019.

(51) Int. Cl.
| G06F 9/44 | (2018.01) |
| G06F 11/36 | (2006.01) |
| G06F 8/65 | (2018.01) |
| G06F 8/38 | (2018.01) |

(52) U.S. Cl.
CPC ............ G06F 11/3624 (2013.01); G06F 8/38 (2013.01); G06F 8/65 (2013.01); G06F 11/3688 (2013.01)

(58) Field of Classification Search
None
See application file for complete search history.

(56) References Cited

U.S. PATENT DOCUMENTS

| 7,761,848 B1 * | 7/2010 | Chaffin | G06F 8/20 |
| | | | 717/116 |
| 7,886,284 B2 * | 2/2011 | Haven | G06F 11/36 |
| | | | 717/138 |

(Continued)

*Primary Examiner* — Anna C Deng
(74) *Attorney, Agent, or Firm* — Rutan & Tucker, LLP

(57) ABSTRACT

A computer-implemented method comprises receiving source code for a user interface program, generating, using the source code, the user interface program, generating, using the source code, a faux backend program, and generate, using the source code, a skeleton Application Programming Interface (API) file. The user interface program and the faux backend program are capable of operating together as part of a test build. The skeleton API file provides a specification for an interface of production software suitable for replacing the faux backend, the specification including respective specifications for a plurality of API calls.

16 Claims, 3 Drawing Sheets

(56) References Cited

U.S. PATENT DOCUMENTS

| | | | |
|---|---|---|---|
| 2016/0085662 A1* | 3/2016 | Huang | G06F 11/3668 |
| | | | 717/124 |
| 2019/0004927 A1* | 1/2019 | Yang | G06F 16/2452 |
| 2019/0132410 A1* | 5/2019 | Kuzkin | H04L 67/2809 |
| 2020/0081692 A1* | 3/2020 | Multerer | G06F 3/0482 |

* cited by examiner

FIG. 2

Table 1

| KAPI Call Components ||| 
| --- | --- | --- |
| Name | Description | required |
| Unique ID | programmer-supplied unique identifier for the Call | yes |
| Return Data Parameter | a KAPI Call Data parameter (see Table 2) for the data returned by the call | yes |
| Input Data Parameters | a list of KAPI Call Data parameters (see Table 2) for the data provided to the call | No |
| Refresh Time | time value (e.g. integer) | No |
| Real-Time Update | list of event emitters that trigger pulling data using, for example, a web socket | No |

FIG. 3

Table 2

| KAPI Call Data Parameter Components ||||
| --- | --- | --- | --- |
| Parameter | Description | Examples | required |
| Data Meaning | e.g. string | "first name," "last name," "country," "birth date," "time sent," "Host Address," "Salary," "Length," "InventoryCount," "ARRAY of [ X, Y, Z ]" | yes |
| Data Format | predefined data format indicator | variable_length_string, fixed_length_string, Date, Timestamp, IPv4_Address, IPv6_Address CurrencyAmount, floating_point_number, integer, unsigned_integer, custom data type | yes |
| Permitted values | List of <Data Format> values | { 2, 3, 5, 7 }, { "N", "E", "S", "W" } | no |
| Permitted Range | pair of <Data Format> values | ( 0, 255 ), ( "01/01/2000", "12/31/2099" ) | no |
| Array Offset | amount to automatically update index into an array by | any signed integer | no |

AUTOMATED API GENERATION

CROSS-REFERENCE TO RELATED APPLICATION

This application claims the benefit of U.S. Provisional Application No. 62/794,446, filed Jan. 18, 2019, which is incorporated by reference in its entirety.

BACKGROUND

1. Technical Field

The technology described herein relates generally to software development. More particularly, the technology relates to automated generation of computer software components that operate to provide user interface designs and production-ready code.

2. Description of the Related Art

User Interfaces (UIs) or Frontends are predicated on the ability of the backend (for example, a database) to get data (from the database) to the frontend (UI) using the middleware (such as may be expressed through Application Programming Interfaces (APIs)). While this may seem straight forward, the development process typically is not.

A typical development process might begin with the Project Management (PM) defining what a new feature must do. The backend team does not have the data the PM wants ready, so they guess at what the data will look like, and how much they will have.

Based on this guess, the middleware team (which in some cases is part of the backend team) make a mock API output file. The mock API output file is a static file that is not a real API, and includes mainly stand-in data and fake formatting (in, for example, JavaScript Open Notation (JSON)) according to the middleware teams best guesses.

After receiving the mock API output file, the UI team then guesses what the API calls will look like, and starts coding the UI based on the faux data and formatting in the mock API output file. While the UI team is working, the backend team works to refine their guess as to what the data and its formatting actually are, and revises the mock API output file accordingly.

Every time the backend team revises the mock API output file, the UI team needs to change their code. In some cases this only involves how the UI code parses the data, but at worst, this involves changing the UI itself because of changes in what data exists or the contents of the data being different than in the previous iteration of the mock API file.

Further complicating the situation, the mock API output file is often not updated every time the data changes, and as a result the UI team is often working with out of date information.

Eventually, once the backend team believes they have the data and how to extract it defined, the middleware team starts finalizing the API structure. As the middleware team changes the APIs, the UI team must also change their code to pull data the right way.

To further protect the front end from breaking, the UI team must put in tests to make sure that the data they intend to get (e.g. Integer, string, IP address) actually is what the API returns (and no errors or Unicode problems arise). Otherwise the backend breaks. Often those tests are forgotten, or not complete, which results in a broken product, and the UI team must fix the front end, and/or the middleware/backend team must figure out why they sent bad data to the front end.

This shortcomings of this process can add months and man hours to a project. Accordingly, a better way to define an API used by software that provides a UI is desirable.

SUMMARY

Embodiments include a computer-implemented method comprising receiving source code for a user interface program, generating, using the source code, the user interface program, generating, using the source code, a faux backend program; and generate, using the source code, a skeleton Application Programming Interface (API) file. The user interface program and the faux backend program are capable of operating together as part of a test build (e.g. usage for a demo, user feedback, experimentation, debugging, etc.). The skeleton API file provides a specification for an interface of production software suitable for replacing the faux backend, the specification including respective specifications for a plurality of API calls.

In an embodiment, the source code for the user interface program includes the plurality of API calls, and the skeleton API file is generated using the plurality of API calls.

In an embodiment, the plurality of API calls each include a plurality of API call components, the plurality of API call components comprising a unique identifier call component and a data parameter call component corresponding to data returned by the call.

In an embodiment, the plurality of API call components further comprises a real-time update call parameter, a refresh time call parameter, one or more data call parameters corresponding to data provided to the call, or combinations thereof.

In an embodiment, the data call parameter comprises a data meaning component and a data format component. In an embodiment, the data call parameter further comprises a permitted values component, a permitted range component, an array offset component, or combinations thereof.

In an embodiment, generating the user interface program includes generating, using the API call components of the API calls in the source code for the user interface programs, tests that validate the data parameters of the API calls, and included in the tests in the user interface program.

In an embodiment, the computer-implemented method further comprises generating, by combining the user interface program with the faux backend program, the test build.

In an embodiment, the computer-implemented method further comprises receiving a production program having an API that complies with the skeleton API file, and generating, by combining the user interface program with the production program, a production build.

In an embodiment, the production program comprises a middleware program developed using the skeleton API file and having an API that complies with the skeleton API file and a backend program. The middleware program implements the plurality of API calls of the skeleton API file using one or more backend function calls of the backend program.

Embodiments include a non-transitory computer readable media comprising computer programming instructions that when executed cause a computer to perform: receiving source code for a user interface program, generating, using the source code, the user interface program, generating, using the source code, a faux backend program, and generate, using the source code, a skeleton Application Programming Interface (API) file. The user interface program and the faux backend program are capable of operating together as part of a test build. The skeleton API file provides a specification for an interface of production software suitable for replacing the faux backend, the specification including respective specifications for a plurality of API calls.

In an embodiment, the non-transitory computer readable media further comprising computer programming instructions that when executed cause the computer to perform generating, by combining the user interface program with the faux backend program, the test build.

In an embodiment, the non-transitory computer readable media further comprising computer programming instructions that when executed cause the computer to perform receiving a production program having an API that complies with the skeleton API file, and generating, by combining the user interface program with the production program, a production build.

BRIEF DESCRIPTION OF THE DRAWINGS

FIG. 2 shows a table of components of a KAPI Call, according to an embodiment.

FIG. 3 shows a table of components of a KAPI Call Data Parameter, according to an embodiment.

DETAILED DESCRIPTION

Embodiments relate to software development. In particular, embodiments relate to processes and products for improving the speed and efficiency of authoring software that provides user interfaces, and the quality and reliability of that software.

Figure 1A:
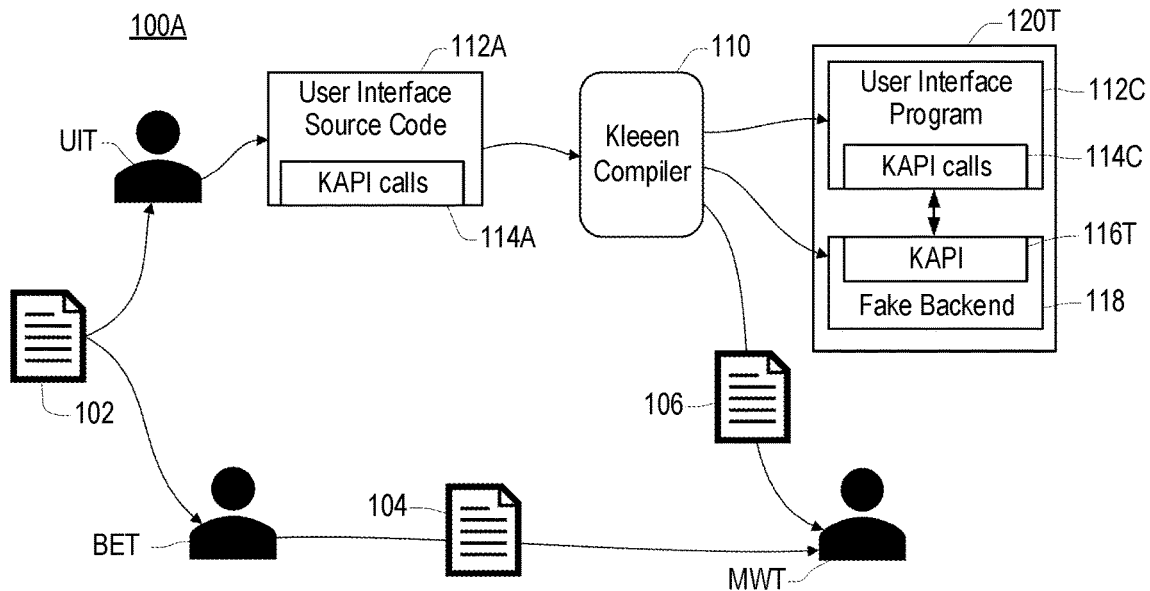
FIG. 1A illustrates a development phase of a User interface (UI) authoring process according to an embodiment.

FIG. 1A illustrates a development phase 100A of a User Interface (UI) authoring process according to an embodiment. The development phase may involve a UI Team UIT, a Backend (BE) Team BET, and a Middleware (MW) Team MWT, each comprising one or more developers. In some cases, a developer may be a member of more than one of the Teams. In some cases, functions of two teams may be performed by a single team.

The development phase 100A begins with the providing of a product specification 102 to the UI Team UIT and the BE Team BET. The product specification 102 describes the features of the product that the teams are to build.

The UI Team UIT authors UI Source Code 112A that, when compiled into machine-executable instructions, will provide a UI on a suitable computing device. The UI Source Code 112A may be included in a non-transitory computer-readable medium. The UI will provide a UI to the product specified by the product specification 102, through which UI a user will be able to access and manipulate data stored in a backend.

The UI Team UIT authors UI Source Code 112A to include Kleeen API (KAPI) calls 114A. The UI Source Code 112A uses the KAPI calls 114A to specify accesses and manipulations of the data stored in the backend. In embodiments, the KAPI calls 114A are the exclusive means by which the UI Source Code 112A specifies the accesses and manipulations to be performed on the data stored in the backend. The KAPI calls 114A may specify calls to a KAPI service.

Each call of the KAPI calls 114A includes information about the data being accessed. The information may include the format for storing the data (e.g., Boolean, unsigned integer, signed integer, floating point number, fixed-length string, variable-length string, etcetera), the meaning of the data (e.g. first name, city name, country name, country code, date, time, currency denomination, IP address, ARRAY of [X, Y, Z], etc.), permissible values for the data, permissible ranges for the data, and so on, and combinations thereof. In an embodiment, the information about the data may be provided in JavaScript Object Notation (JSON), eXtensible Markup Language (XML), or the like.

At any time during the development phase 100A, the UI Team UIT may compile (or in some embodiments, compile and link) the UI Source Code 112A using a Kleeen compiler 110 (that is, a compiler designed to produce, inter alia, the KAPI call code sequences 114C from the KAPI calls 114A). The Kleeen compiler 110 may produce three outputs: a UI Program 112C, a Fake BE 118, and a skeleton API file 106, each of which may be included in a non-transitory computer-readable medium. In an embodiment, the Kleeen compiler 110 may include a pre-processor that processes the KAPI calls 114A for compilation by a compiler of the related art, such as a C compiler, C++ compiler, a Java complier, and so on. In an embodiment, the Kleeen compiler 110 may processes the KAPI calls 114A into a front-end web framework such as Angular or React. In embodiments, the Kleeen compiler 110 may be web based, such as a web-based Software as a Service (SaaS).

The UI Program 112C may include, among other things, computer programming instructions that when executed by a computer provide a UI in accordance with the UI Source Code 112A. The UI Program 112C includes code sequences 114C that perform KAPI calls.

The Fake BE 118 may include, among other things, computer programming instructions that when executed by a computer provide a test KAPI service 116T that may be called by the code sequences 114C that perform KAPI calls. The data provided by the test KAPI service 116T is generated by the Fake BE 118 according to the information about the data included in all of the KAPI calls 114A included in the UI Source Code 112A.

When linked together, the UI Program 112C and the Fake BE 118 form a test build 120T of the product being authored. The test build 120T presents and allows exercising of the UI coded in the UI Source Code 112A using fake data provided by the Fake BE 118, wherein the fake data conforms to the information provided about it in the KAPI calls 114A. For example, if the data for a field in the UI is identified in a KAPI call as being a date, the value returned by the KAPI call will be a valid date. In embodiments, fake data may have values that follow a probabilistic distribution specified by a developer. In embodiments, the probabilistic distribution may be a normal distribution, a Poisson distribution, a binomial distribution, an exponential distribution, or the like. For example, fake data for provided by the Fake BE 118 for one parameter might be whole numbers from 1 to 100 in a bell curve centered at 36. In another example, fake data provided by the Fake BE 118 for another parameter might be fruit names having a logarithmic distribution so that some fruit names occur more often than others.

Figure 1B:
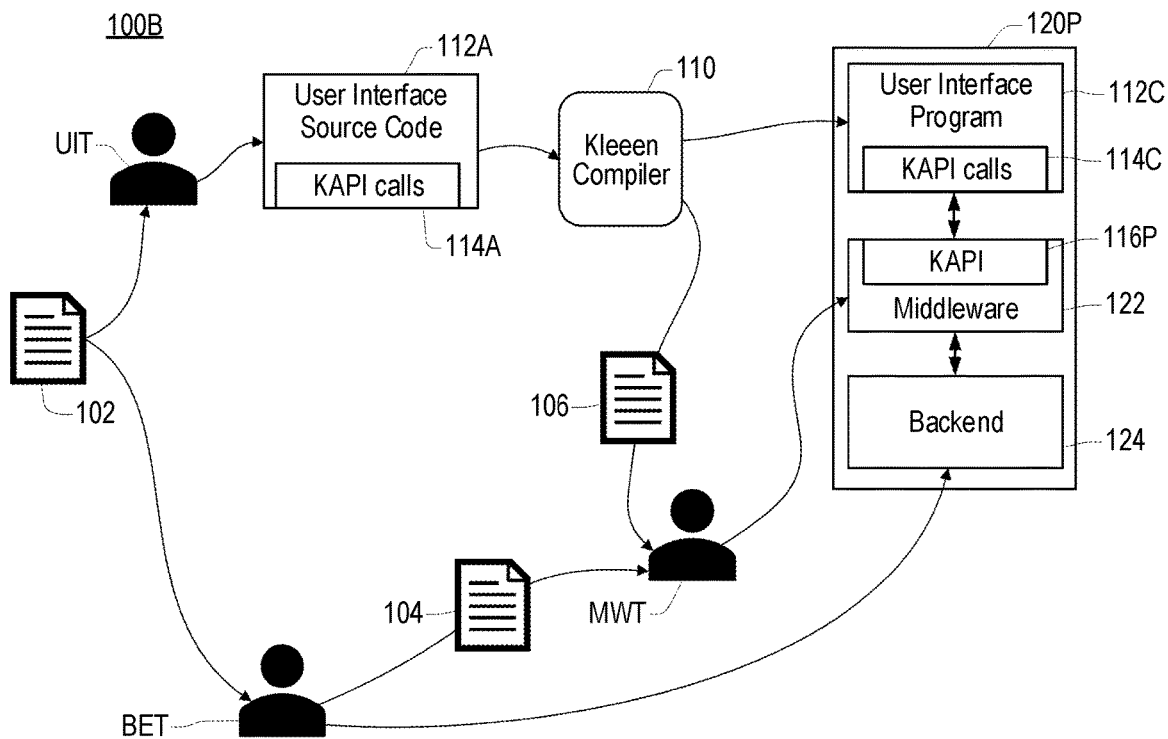
FIG. 1B illustrates a production phase of a User interface (UI) authoring process according to an embodiment

The data used to populate the Fake BE 118 may be exported to a different database system, and in particular to a database system of the type that will be used in a production build described in FIG. 1B. This allows the BE Team BET to more easily create a test database for testing the production build.

The UI Team UIT may use the test build 120T to determine if the UI Source Code 112A is providing a UI according to the product specification 102, and may revise the UI Source Code 112A according to what they learn by evaluating the test build 120T. Any number of compile-evaluate-revise cycles may be performed.

The UI Team UIT may also use the test build 120T to experiment with various options and configurations for the UI being provided, and to do Quality Assurance (QA) on the UI. The test build 120T may also be used to demonstrate the UI to a client.

Notably, neither the BE Team BET or the MW Team MWT is involved in or necessary for the creation of the test build 120T.

While the UI Team UIT is developing the test build 120T, the BE team BET may simultaneously be developing, based on the product specification 102, a production backend. In the course of developing the production backend, the BE Team BET may provide a backend interface specification 104 to the MW Team MWT. The BE team BET does not need to waste time making a mock API output file that might quickly become out-of-date, and the UI team can start upon receiving the production specification without waiting for the mock API output file.

The skeleton API file 106 produced by the Kleeen compiler 110 is a design document specifying the syntax and semantics of the interface to the KAPI service 116T. The skeleton API file 106 defines a plurality of API calls for the KAPI, including the formats and types of the parameters passed to each API call, and the return type and format of data returned by each API call.

In embodiments, the skeleton API file 106 may include abstract classes in Java, or a could be a "dot-h" file in C. The skeleton API file 106 may be provided to the MW Team MWT for use in authoring middleware of a production build, as discussed with respect to FIG. 1B, below.

FIG. 1B illustrates a production phase 100B of a User Interface (UI) authoring process according to an embodiment. The production phase 100B may be a modification of the development phase 100A of FIG. 1A, discussed above.

Rather than building a test build 120T as in FIG. 1, the production phase 100B builds a production build 120P. The production build 120P includes the UI Program 112C, a middleware program 122, and a backend program 124. The production build 120P may be suitable for delivery to a client.

The UI Program 112C and the skeleton API file 106 are developed is disclosed in FIG. 1A.

The BE Team BET develops the backend program 124 according to the product specification 102, and may do so in parallel with the development of the UI Program 112C. The BE Team BET also develops the backend interface specification 104 and delivers it to the MW Team MWT. The backend interface specification 104 defines the interface to the backend program 124 as a plurality of backend function calls.

The MW Team MWT develops the middleware program 122 according to the skeleton API file 106 and the backend interface specification 104. The middleware program 122 implements each of the plurality of API calls for the KAPI defined by the skeleton API file 106 using one or more of the backend function calls defined in the backend interface specification 104.

In an embodiment, the UI Program 112C, the middleware program 122, and the backend program 124 are produced by separate compilations of their respective source code, and the outputs of those compilations linked together to create the production build 120P. In another embodiment, the UI Program 112C, the source code for the middleware program 122, and the source code for the backend program 124 are compiled together using the Kleeen compiler 110 to create the production build 120P.

In an embodiment, the middleware program 122 and the backend program 124 are included in a single program developed by a combined backend/middleware team.

One benefit of the development process described in FIGS. 1A and 1B is that if the backend program 124 or the interface to the backend program 124 changes, the UI team UIT is not affected, does not need to be notified, and does not need to change anything in the UI Source Code 112A. Instead, if there is a change introduced by the BE Team BET, the consequences of that change are dealt with by the BE Team BET, the MW Team MWT, or both.

When the production build 120P is needed, such as for shipping to a client, the teams simply switch out the fake backend 118 that was generated by the Kleeen compiler 110 for the middleware program 122 and the backend program 124 developed by the other teams. In embodiments, test suits for the UI developed using the fake backend 118 are used to test the production build 120P before shipment.

FIG. 2 shows a Table 1 of components of a KAPI Call, according to an embodiment. The components are in addition to the identifier of the function being called. Some components are required, others are optional.

A Unique ID must be supplied for every KAPI Call. This allows one KAPI call to satisfy multiple parts of the UI (by stuffing a ton of data inside that one call), which improves efficiency. Any UI element with a KAPI call can reference the last call a parent UI element made, when coding in the skeleton API file. As a result, UI elements can pull data from other KAPI calls, reducing the number of access to the backend.

Every KAPI Call must have a Return Data Parameters, as described with respect to FIG. 5. A KAPI Call may also have one or more Input Data Parameters, also as described with respect to FIG. 3.

A KAPI Call may optionally include a Refresh Time parameter. This allows the data for a UI element to be pulled at a regular interval from the backend, and the UI element updated with the new data. This can contain controls to pause, or change the timer programmatically (e.g. a UI element can change the refresh rate).

A KAPI Call may optionally include a Real-Time Update parameter. The Real Time Update parameter includes an indication of an event emitter or a list of indication of respective event emitters. Even emitters may correspond to a creation event, an update event, a deletion event, or a combination thereof.

When an event associated with an event emitter included in the Real-Time Update parameter occurs, data is pulled from the backend in response. This may be accomplished using, for example, a web socket. The UI element is then updated using the pulled data.

FIG. 3 shows a Table 2 of components of a KAPI Call Data Parameter, according to an embodiment. Table 2 illustrates required and optional information that may be specified for a Return Data Parameter or an Input Data Parameter of a KAPI Call.

Each KAPI Call Data Parameter has a respective Data Meaning. The Data Meaning may be used as a key for accessing data in the backend. The Data Meaning may also be displayed in the UI as a label, pop-up hint, prompt, or the like. In embodiments, the Data Meaning is expressed as a string.

The Data Meaning may be an array. For example, the Data Meaning may be an "ARRAY of [First_Name, Middle_Initial, Last_Name]."

Each KAPI Call Data Parameter has a respective Data Format. The Data Format corresponds to a predefined data type. In an embodiment, Data Format is indicated using a predefined constant value. In another embodiment, Data Format is indicated using a string. When the Data Meaning is an ARRAY, the Data Format corresponds to the data type of the elements of the ARRAY.

The Data Format may be a custom data type. The custom data type may be defined in a JSON file and referred to using symbolic names defined in the JSON file.

A KAPI Call Data Parameter may optionally have a Permitted Values indication. In an embodiment, the Permitted Values indication may be a list of value of the Data Format type of the KAPI Call Data Parameter. In an embodiment, the Permitted Values indication may be data retrieved from the backend.

In embodiment, a Permitted Values indication may be a predetermined indication specific to the Data Format of the KAPI Call Data Parameter. For example, when the Data Format is an IPv4 Address, a Permitted Value indication may indicate a network size selected from ANY, TYPE_A, TYPE_B, TYPE_C and contents of the network number bits of the specified size of network. In another example, when the Data Format is an IPv4 Address, a Permitted Value indication may indicate 4-byte network address mask and a 4-byte value including the permitted values of the bits masked by the network address mask.

A KAPI Call Data Parameter may optionally have a Permitted Range indication. In an embodiment, the Permitted Range indication may include a minimum value and a maximum value, each having the Data Format type of the KAPI Call Data Parameter. In an embodiment, the Permitted Range indication may be data retrieved from the backend.

Referring to FIGS. 1A and 1B, when UI Source Code including a KAPI Call 114A is compiled, the code sequences 114C generated by the compiler to the perform the KAPI call 114A may include one or more automatically generated tests to ensure that the Data Parameters of the KAPI Call are of the right format and within a valid range. The automatically generated tests for a Data Parameter may be based on the Data Format of the Data Parameter, a Permitted Values indication of the Data Parameter (if present), a Permitted Range indication of the Data Parameter (if present), or combinations thereof.

For example, tests generated from the Data Format may test whether currency amounts are integers or fixed-point numbers, IPv4 addresses are 4 numbers between 0 and 255 each separated by a dots, and so on. This allows for automated checks to prevent errors, without anyone having to manually code these checks. If the test fails, a list is generated detailing what the errors were. The list detailing the errors may then be presented or made available to the teams.

KAPI Call Data Parameter that has an ARRAY Data Meaning may optionally have Array Offset indication, that specifies an amount to increment or decrement an internal index of the array on each request. This simplifies the implementation of infinite scrolling or pagination. The UI Team UIT does not have to write code to manage the internal index, because the necessary code is generated by the KAPI compiler.

KAPI Calls can also have full-text query search to simplify global search functionality. It includes sorting, ordering and query operators (greater than, equal, etc.) to satisfy the maximum possible of data search queries. The endpoints will provide the functionality to parse the URL query params. Table 3, below, shows example of KAPI calls using full text query search.

TABLE 3

KAPI full-text query call examples.

GET /users?username=Borer__Aylin
GET /users?username=Borer__Aylin&address=some
GET /users?q=Ella
GET /users?username__like=Borer
GET /users?username__ne=Borer__Aylin
GET /users?version__gte=Borer__Aylin
GET /users?__sort=username&__order=asc
GET /users?__sort=username,device&__order=asc,desc In an embodiment, the UI Program 112C may be generated to include an Inspect mode. In Inspect Mode, when a UI element is selected (such as by a mouse click), a list of the KAPI generated APIs that are feeding that UI element may be displayed. The KAPI generated APIs that are feeding that UI element may be displayed in, for example, a pop-up menu. This allows the teams to better understand the context in which the KAPI generated APIs are being used.

Figure 4:
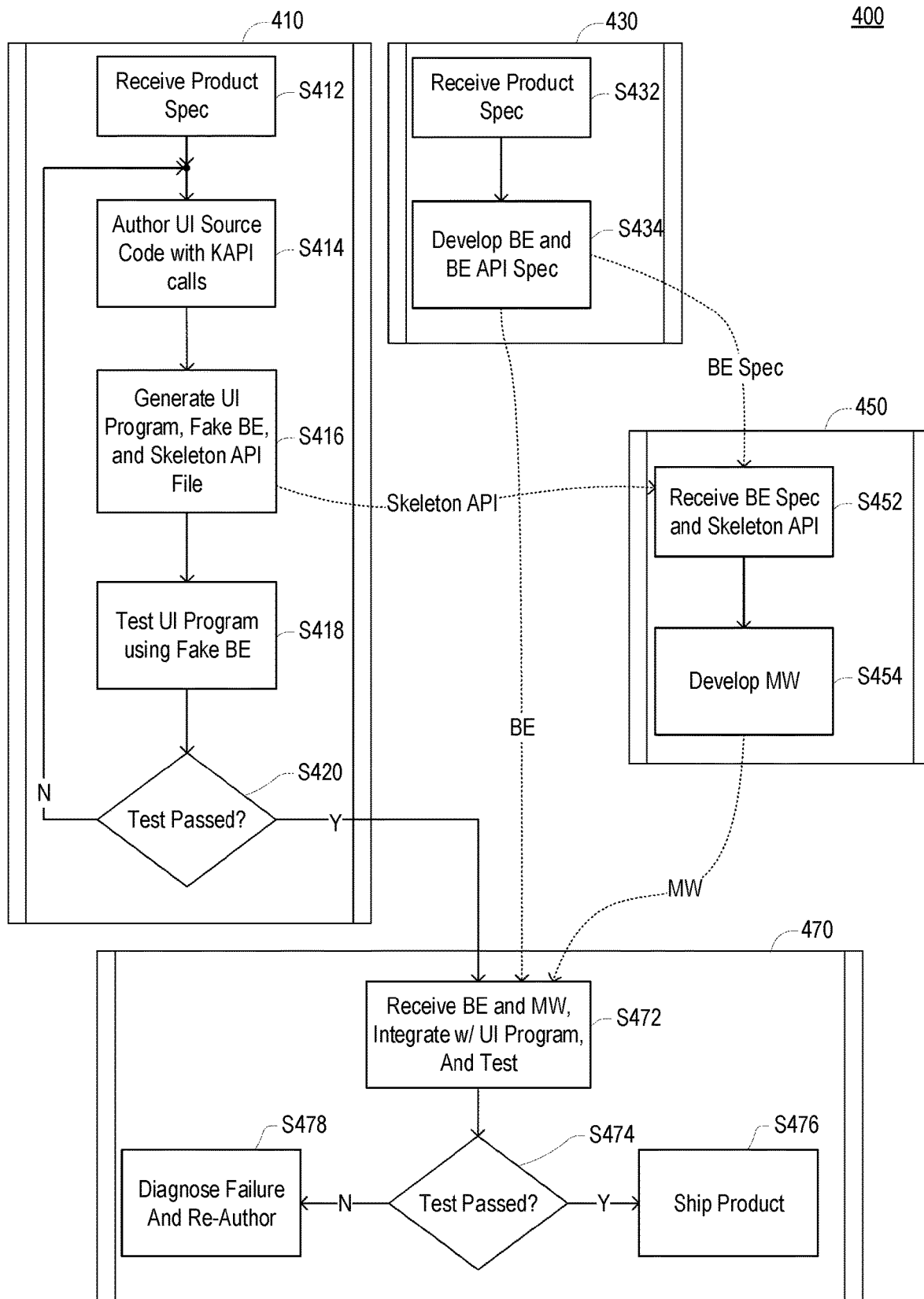
FIG. 4 illustrates a process for developing a product including a User Interface, according to an embodiment.

FIG. 4 illustrates a process 400 for developing a product including a User Interface, according to an embodiment. The process 400 includes a User interface (UI) development subprocess 410, a backend (BE) development subprocess 430, a middleware (MW) development subprocess 450, and a production build subprocess 470. Each of the subprocesses of the process 400 may be performed in parallel, subject to the availability of the required inputs for each.

In embodiments, each of the subprocesses of the process 400 may be performed by a team of developers using the appropriate computer-based software development tools, and some steps may be completely or partially automated. In embodiments, one or more of the subprocesses are completely automated. In the description below, details of operations that are widely known in the art are omitted in the interest of brevity.

The UI development subprocess 410 has only a single required input: a product specification. At S412, the UI development subprocess 410 receives the product specification.

At S414, the UI development subprocess 410 authors the UI source code. The UI source code includes Kleeen API calls, as described above.

At S416, the UI development subprocess 410 processes the UI source code to generate one or more of a UI program, a Fake BE, and a Skeleton API file. The UI program, the Fake BE, and the Skeleton API file may be generated by a pre-processor, a compiler, a web-based service, or combinations thereof.

The UI program includes computer programming instructions for providing a user interface on a computer or a device including a computer. The UI program includes calls to a Kleeen API service that access data from a backend, code to present data on the UI, and code to receive data through the UI. The UI program may further include code that validates the data from the backend or received through the UI.

The Fake BE is a program that provides test data in response to calls to the Kleeen API service. The test data is of an appropriate format and has a valid value for the requested data. Accordingly, the Fake BE is suitable for testing the UI program.

The Skeleton API file includes information on the Kleeen API calls included in the UI source code. The information includes type, format, and other information regarding the parameters of each Kleeen API calls. The information may be expressed, for example, as a Java abstract class, in a markup language such as XML, or as a C "dot-h" file. The Skeleton API file may be provided to the MW development process 450.

At S418, the UI development subprocess 410 tests the UI program using the Fake BE.

At S420, the UI development subprocess 410 proceeds to S472 of the production build subprocess 470 if the tests performed at S418 passed; otherwise, at S420 the UI development subprocess 410 proceeds to S414 to continue development of the UI Source code.

The BE development subprocess 430 has only a single required input: the product specification. At S432, the BE development subprocess 430 receives the product specification.

At S434, the BE development subprocess 430 uses the product specification to produce a backend (BE) and a BE API specification. The backend may be provided to the production build subprocess 470. The BE API specification may be provided to the MW development subprocess 450.

The MW development subprocess 450 has two required inputs: the BE API specification and the Skeleton API file. At S452, the MW development subprocess 450 receives the BE API specification and the Skeleton API file. The BE API specification and the Skeleton API file can be received in any order.

At S454, the MW development subprocess 450 uses the BE API specification and the Skeleton API file to produce the middleware (MW). The middleware may be provided to the production build subprocess 470.

The production build subprocess 470 has three required inputs: the UI program, the middleware, and the backend. At S472, the production build subprocess 470 receives the UI program, the middleware, and the backend, then integrates them into a production build. The production build subprocess 470 then tests the production build. In an embodiment, the production build subprocess 470 tests the production build using a database including data, provided by the UI development process 410 using an automated process, that was used by the Fake BE.

At S474, the production build subprocess 470 proceeds to S476 if the tests performed at S472 passed; otherwise, at S474 the production build subprocess 470 proceeds to S478.

At S476, the production build subprocess 470 ships the successfully tested production build.

At S478, the production build subprocess 470 analyzes the failures that occurred at S472, and communicates the analysis results back to one or more of the other subprocesses. The appropriate subprocess or subprocesses are then performed again to remedy the failures.

Embodiments of the present disclosure include electronic devices configured to perform one or more of the operations described herein. However, embodiments are not limited thereto. Embodiments of the present disclosure may further include systems configured to operate using the processes described herein.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and so on. The program instructions may be adapted to execute the processes described herein.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A computer-implemented method, comprising:
   receiving data including source code, wherein the source code is for a user interface program, and wherein the source code includes a plurality of Application Programming Interface (API) calls, wherein each of the plurality of API calls includes a plurality of API call components;
   generating, using the source code, the user interface program, wherein the user interface program includes executable code, wherein generating the user interface program includes generating, using the plurality of API call components of the each of the plurality of API calls, tests that validate data call parameters of the plurality of API calls in the user interface program;
   generating, using the data, a faux backend program, wherein generating the faux background program includes generating data having data types as specified by the plurality of API calls and storing the generated data in a database system, wherein the faux backend program includes an API service, wherein the API service receives an API call from the user interface program and retrieves requested data from the generated data stored in the database system; and
   generating, using the data, a skeleton API file based on specifications of the plurality of API calls, the skeleton API file specifying syntax and semantics of the each of the plurality of API calls utilized by the user interface program, wherein the user interface program, upon execution, is configured to access the generated data via the plurality of API calls.

2. The computer-implemented method of claim 1, wherein the plurality of API call components of the each of the plurality of API calls comprising:
   a unique identifier call component; and
   a data parameter call component corresponding to data returned by a corresponding API call of the each of the plurality of API calls.

3. The computer-implemented method of claim 2, wherein the plurality of API call components of the each of the plurality of API call further comprise a real-time update call parameter, a refresh time call parameter, one or more data call parameters corresponding to data provided to the call, or combinations thereof.

4. The computer-implemented method of claim 3, wherein the one or more data call parameters comprise:
a data meaning component,
a data format component, and
one or more of a permitted values component, a permitted range component, or an array offset component.

5. The computer-implemented method of claim 1, further comprising:
receiving a production program having an API that complies with the skeleton API file; and
generating, by combining the user interface program with the production program, a production build.

6. The computer-implemented method of claim 1, wherein a compiler performs operations of receiving the source code, generating the user interface program and generating the skeleton API file.

7. The computer-implemented method of claim 1, wherein a specification of an API call includes information of a structure of the API call including a data type to be returned by the API call.

8. A non-transitory computer readable media comprising computer programming instructions that when executed cause a computer to perform:
receiving data including source code, wherein the source code is for a user interface program, and wherein the source code includes a plurality of Application Programming Interface (API) calls, wherein each of the plurality of API calls includes a plurality of API call components;
generating, using the source code, the user interface program, wherein the user interface program includes executable code, wherein generating the user interface program includes generating, using the plurality of API call components of the each of the plurality of API calls, tests that validate data call parameters of the plurality of API calls in the user interface program;
generating, using the data, a faux backend program, wherein generating the faux background program includes generating data having data types as specified by the plurality of API calls and storing the generated data in a database system, wherein the faux backend program includes an API service, wherein the API service receives an API call from the user interface program and retrieves requested data from the generated data stored in the database system; and
generating, using the data, a skeleton API file based on specifications of the plurality of API calls, the skeleton API file specifying syntax and semantics of each of the plurality of API calls utilized by the user interface program, wherein the user interface program, upon execution, is configured to access the generated data via the plurality of API calls.

9. The non-transitory computer readable media of claim 8, wherein the plurality of API calls components of the each of the plurality of API call comprising:
a unique identifier call component; and
a data parameter call component corresponding to data returned by a corresponding API call of the each of the plurality of API calls.

10. The non-transitory computer readable media of claim 9, wherein the plurality of API call components of the each of the plurality of API calls further comprise a real-time update call parameter, a refresh time call parameter, one or more data call parameters corresponding to data provided to the call, or combinations thereof.

11. The non-transitory computer readable media of claim 10, wherein the one or more data call parameters comprise:
a data meaning component;
a data format component: and
one or more of a permitted values component, a permitted range component or an array offset component.

12. The non-transitory computer readable media of claim 8, further comprising computer programming instructions that when executed cause the computer to perform:
generating, by combining the user interface program with the faux backend program, a test build.

13. The non-transitory computer readable media of claim 8, further comprising computer programming instructions that when executed cause the computer to perform:
receiving a production program having an API that complies with the skeleton API file; and
generating, by combining the user interface program with the production program, a production build, wherein the production program comprises:
a middleware program developed using the skeleton API file and having an API that complies with the skeleton API file; and
a backend program;
wherein the middleware program implements a plurality of API calls of the skeleton API file using one or more backend function calls of the backend program.

14. The non-transitory computer readable media of claim 8, wherein a compiler performs operations of receiving the source code, generating the user interface program and generating the skeleton API file.

15. The non-transitory computer readable media of claim 8, wherein a specification of an API call includes information of a structure of the API call including a data type to be returned by the API call.

16. A system comprising:
one or more processors; and
non-transitory computer readable medium having logic stored thereon that, when executed by the one or more processors, causes performance of operations including:
receiving data including source code, wherein the source code is for a user interface program, and wherein the source code includes a plurality of Application Programming Interface (API) calls, wherein each of the plurality of API calls includes a plurality of API call components,
generating, using the source code, the user interface program, wherein the user interface program includes executable code, wherein generating the user interface program includes generating, using the plurality of API call components of the each of the plurality of API calls, tests that validate data call parameters of the plurality of API calls in the user interface program,
generating, using the data, a faux backend program, wherein generating the faux background program includes generating data having data types as specified by the API calls and storing the generated data in a database system, wherein the faux backend program includes an API service, wherein the API service receives an API from the user interface program and retrieves requested data from the generated data that is stored in the database system, and
generating, using the data, a skeleton API file based on specifications of the plurality of API calls, the skeleton API file specifying syntax and semantics of each of the plurality of API calls utilized by the user interface program, wherein the user interface program, upon execution, is configured to access the generated data via the plurality of API calls.

* * * * *